United States Patent [19]
Liu et al.

[11] Patent Number: 5,458,384
[45] Date of Patent: Oct. 17, 1995

[54] BIFURCATED, ORBITAL REPLACEMENT UNIT INTERFACE

[75] Inventors: King-Heng Liu, Thornhill; Gordon Rife, Schomberg, both of Canada

[73] Assignee: Canadian Space Agency, Canada

[21] Appl. No.: 111,061

[22] Filed: Aug. 24, 1993

[51] Int. Cl.⁶ .............................. B25J 19/00; B64G 1/64
[52] U.S. Cl. .................. 294/1.1; 244/161; 294/86.4; 294/902; 901/30
[58] Field of Search ................... 294/1.1, 82.26, 294/82.32, 86.4, 90, 91, 106, 119.1, 902; 244/137.4, 158 R, 161; 269/257, 268, 270, 271, 900, 902; 403/13, 14, 24, 322, 345, 348, 360, 375, 381; 901/30, 31, 39

[56] References Cited

U.S. PATENT DOCUMENTS

| | | | |
|---|---|---|---|
| 4,295,740 | 10/1981 | Sturges | 244/161 X |
| 5,044,063 | 9/1991 | Voellmer | 294/86.4 X |
| 5,120,101 | 6/1992 | Vranish | 294/902 X |
| 5,261,758 | 11/1993 | Vranish | 901/30 X |
| 5,320,395 | 6/1994 | Gernhardt et al. | 294/86.4 |

*Primary Examiner*—Johnny D. Cherry
*Attorney, Agent, or Firm*—David J. French

[57] ABSTRACT

A bifurcated, orbital replacement unit interface comprises a body and two pairs of fingers extending outwardly from opposite sides of the body, wherein each pair of fingers provides a bifurcation between their inner sides in the form of an inwardly tapering recess. All of the inner sides of the fingers are bevelled for aligning a correspondingly shaped anvil in the tapering recess.

5 Claims, 1 Drawing Sheet

BIFURCATED, ORBITAL REPLACEMENT UNIT INTERFACE

BACKGROUND OF THE INVENTION

This invention relates to a bifurcated, interface for engaging an object to be manipulated.

This invention is particularly useful for providing a bifurcated, orbital replacement unit interface for use as an interface attached to an article orbiting the earth, e.g. a satellite, whereby the interface may be used to retrieve that article, or component parts thereof, by gripping jaws.

One type of interface has been designed for the retrieval and perhaps the replacement of small component parts of an orbital replacement unit, as a means of servicing a satellite, and is described and claimed in co-pending U.S. patent application Ser. No. 8/005,066, filed Jan. 15, 1993. This interface is square in cross-section in plan view, and has a side view cross-section of chamfered walls similar to the side view of a sewing machine bobbin, so that gripping anvils can receive, align with and grip opposed chamfered wall corners of this square-bobbin-shaped interface.

While the square-bobbin-shaped interface is useful for servicing operations, it cannot be gripped sufficiently against slippage for retrieving and holding, for example, the orbiting satellite for, for example, transporting the satellite or holding the satellite for a servicing operation.

Previous attempts to provide an interface which can be gripped sufficiently, for, for example, transporting or servicing a satellite have been found to be prone to jam and to be damaged, resulting in difficulties in releasing the interface and to loss of accuracy in alignment with the gripping anvils after repeated use.

There is a need for an interface which can be gripped sufficiently for, for example, transporting or servicing a satellite, and which is not prone to jam and to be damaged, which will result in difficulties in releasing the interface and to loss of accuracy in alignment with the gripping anvils after repeated use.

There is also a need for an interface which will provide no backlash when gripped firmly by gripping anvils, and yet which will align with the gripping anvils in all of the axes x, y and z at right angles with one another.

The invention in its general form will first be described, and then its implementation in terms of specific embodiments will be detailed with reference to the drawings following hereafter. These embodiments are intended to demonstrate the principle of the invention, and the manner of its implementation. The invention in its broadest and more specific forms will then be further described, and defined, in each of the individual claims which conclude this Specification.

SUMMARY OF THE INVENTION

According to the present invention there is provided a bifurcated interface suitable for orbital replacement comprising a body, and two pairs of fingers extending outwardly from opposite sides of the body, wherein each pair of fingers provides a bifurcation between their inner sides in the form of a recess which tapers inwardly towards the body, and all of the inner sides of the fingers are bevelled for aligning correspondingly shaped gripping anvils in the recesses.

In some embodiments of the present invention, the bevelled inner sides of the fingers shape inner portions of the fingers as truncated triangles in cross-section.

The truncated triangles may be isosceles triangles.

Strengthening webs may extend along the sides of the body joining outer sides of the fingers.

A portion of relatively larger cross-section of the body may extend beneath the fingers and the strengthening webs, mounting ribs may be provided on the underside of the body, and mounting screw passages may extend downwardly through the strengthening webs, and through portions of the body beneath the strengthening web, at positions adjacent the outer sides of the fingers.

The foregoing summarizes the principal features of the invention and some of its optional aspects. The invention may be further understood by the description of the preferred embodiments, in conjunction with the drawings, which now follow.

SUMMARY OF THE FIGURES

In the accompanying drawings which illustrate, by way of example, an embodiment of the present invention.

DESCRIPTION OF THE PREFERRED EMBODIMENT

Figures 1, 2:
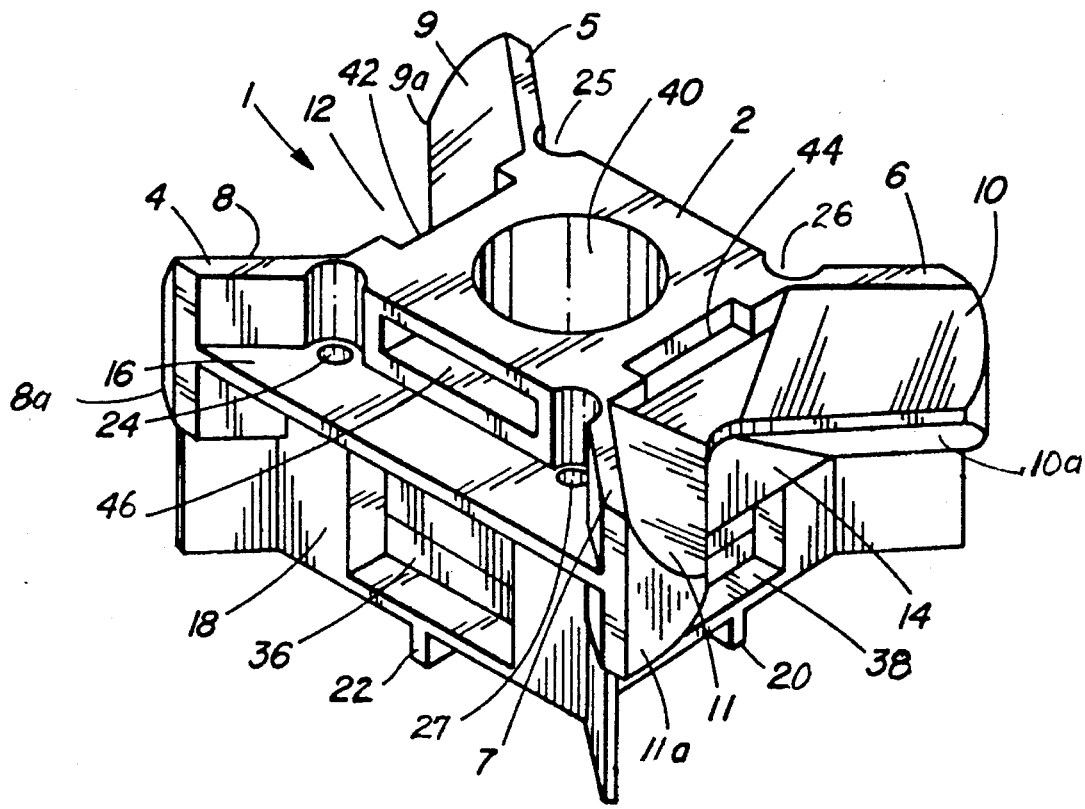
FIG. 1 is a corner view of a bifurcated, orbital replacement unit
FIG. 2 is a corner view of one of a pair of similar gripping anvils for gripping therebetween the interface shown in FIG. 1.

In FIG. 1 there is shown a bifurcated, orbital replacement interface, generally designed 1, comprising a body 2, and two pairs of fingers 4, 5 and 6, 7, extending outwardly from opposite sides of the body 2, wherein each pair of fingers 4, 5 and 6, 7 provides a bifurcation between their inner sides 8, 8a, 9, 9a and 10, 10a, 11, 11a respectively, in the form of a recess, 12 and 14 respectively, which tapers inwardly towards the body 2, and all of the inner sides 8 to 11 of the fingers 4 to 7 are bevelled for aligning correspondingly shaped gripping anvils (to be described later) in the recesses 12 and 14.

The bevelled inner sides 8 to 11 of the fingers 4 to 7 shape inner portions of the fingers 4 to 7 as truncated triangles in cross-section. This is clearly shown for the finger designated 7 where the truncated triangles are isosceles triangles.

Strengthening webs, such as that designated 16, extend along the sides of the body 2 joining outer sides, such as fingers 4 and 7 of the fingers.

A portion 18 of relatively larger cross-section of the body 2 extends beneath the fingers 4 to 7 and the strengthening webs, such as web 16. Mounting ribs, such as those designated 20 and 22, are provided on the underside of the body 2, and mounting screw passages 24 to 27 extend downwardly through the strengthening webs, such as web 16, and through portions of the body 2 beneath the strengthening web, such as web 16, at positions adjacent the outer sides of the fingers 4 to 7.

In FIG. 2, there is shown one of a pair of similar gripping anvils for gripping the interface shown in FIG. 1. These gripping anvils are described and claimed in co-pending U.S. patent application Ser. No. 08/11,065, filed Aug. 24, 1993.

The gripping anvil, generally designated 30 has two opposed, rearwardly diverging notches 32 and 34 in the side faces 55 and 56 respectively.

Two of the anvils 30 are mounted with the rearwardly diverging notches 32 and 34 facing one another. The interface 1 is positioned between the anvils 30 with the bevelled inner sides 8 to 11 of the fingers 4 to 7 roughly aligned with the notches 32 and 34.

The anvils 30 are then moved towards one another to grip the interface 1 between them. As the bevelled inner sides 8 to 11 of the fingers 4 to 7 enter into sliding contact with the notches 32 and 34, the interface and the anvils are aligned, in all of the axes X,Y and Z, and then the interface 1 is clamped firmly between the anvils 30 with substantially no backlash being allowed to occur between the anvils 30 and the interface 1.

The interface 1 is provided with lightening recesses, such as those designated 36 and 38 (FIG. 1).

The interface 1 is also provided with a locating passage 40, tab engaging recesses 42 and 44, and anvil engaging slots, such as that shown and designated 46, for the interface 1 to be gripped by a hand tool (not shown).

While the interface has been described in an application suitable for an orbiting body, it is equally suited to any application whereby it is desired to grasp an object with gripping jaws.

CONCLUSION

The foregoing has constituted a description of specific embodiments showing how the invention may be applied and put into use. These embodiments are only exemplary. The invention in its broadest, and more specific aspects, is further described and defined in the claims which now follow.

These claims, and the language used therein, are to be understood in terms of the variants of the invention which have been described. They are not to be restricted to such variants, but are to be read as covering the full scope of the invention as is implicit within the invention and the disclosure that has been provided herein.

The embodiments of the invention in which an exclusive property is claims as follows:

1. A bifurcated interface comprising a body, and two pairs of fingers extending outwardly from opposite sides of the body, each pair of fingers provides a bifurcation between their inner sides in the form of a recess which tapers inwardly towards the body, and all of the inner sides of the fingers are bevelled for aligning correspondingly shaped gripping anvils in the recesses.

2. An interface according to claim 1, wherein the bevelled inner sides of the fingers shape inner portions of the fingers as truncated triangles in cross-section.

3. An interface according to claim 2, wherein the truncated triangles are isosceles triangles.

4. An interface according to claim 1, wherein strengthening webs extend along the sides of the body joining outer sides of the fingers.

5. An interface according to claim 4, wherein a portion of relatively larger cross-section of the body extends beneath the fingers and the strengthening webs, mounting ribs are provided on the underside of the body, and mounting screw passages extend downwardly through the strengthening webs, and through portions of the body beneath the strengthening webs, at positions adjacent the outer sides of the fingers.

* * * * *